(12) United States Patent
Kamiyama

(10) Patent No.: US 7,954,844 B2
(45) Date of Patent: Jun. 7, 2011

(54) CURTAIN AIR BAG DEVICE AND METHOD OF PRODUCING THE SAME

(75) Inventor: Takuya Kamiyama, Fuji (JP)

(73) Assignee: Nihon Plast Co., Ltd., Shizuoka (JP)

( * ) Notice: Subject to any disclaimer, the term of this patent is extended or adjusted under 35 U.S.C. 154(b) by 123 days.

(21) Appl. No.: 12/372,208

(22) Filed: Feb. 17, 2009

(65) Prior Publication Data

US 2009/0212540 A1 Aug. 27, 2009

(30) Foreign Application Priority Data

Feb. 21, 2008 (JP) ................................. 2008-040383

(51) Int. Cl.
*B60R 21/233* (2006.01)

(52) U.S. Cl. ..................................... 280/729; 280/730.2

(58) Field of Classification Search .................. 280/729, 280/730.2, 728.1
See application file for complete search history.

(56) References Cited

U.S. PATENT DOCUMENTS

| | | | | |
|---|---|---|---|---|
| 5,464,250 | A * | 11/1995 | Sato | 280/743.1 |
| 5,797,621 | A * | 8/1998 | Ono | 280/730.2 |
| 6,334,625 | B1 * | 1/2002 | Pausch et al. | 280/729 |
| 6,398,253 | B1 * | 6/2002 | Heigl | 280/729 |
| 6,530,595 | B2 * | 3/2003 | Masuda et al. | 280/730.2 |
| 6,962,364 | B2 * | 11/2005 | Ju et al. | 280/730.2 |
| 7,025,375 | B2 * | 4/2006 | Drossler et al. | 280/729 |
| 7,264,269 | B2 * | 9/2007 | Gu et al. | 280/730.2 |
| 7,614,648 | B2 * | 11/2009 | Heudorfer et al. | 280/729 |
| 7,654,560 | B2 * | 2/2010 | Yokoyama et al. | 280/729 |
| 7,712,770 | B2 * | 5/2010 | Kalliske et al. | 280/729 |
| 2006/0043702 | A1 | 3/2006 | Jamison | |
| 2006/0202452 | A1 | 9/2006 | Breed et al. | |
| 2007/0170706 | A1 | 7/2007 | Yokoyama et al. | |
| 2008/0185823 | A1 | 8/2008 | Kalliske et al. | |
| 2009/0206582 | A1 * | 8/2009 | Kumagai et al. | 280/729 |

FOREIGN PATENT DOCUMENTS

| | | |
|---|---|---|
| DE | 10220364 A1 | 12/2003 |
| GB | 2372237 A | 8/2002 |
| JP | 2007-196856 A | 8/2007 |

OTHER PUBLICATIONS

Search Report dated Mar. 27, 2009.

* cited by examiner

*Primary Examiner* — Paul N Dickson
*Assistant Examiner* — Timothy D Wilhelm
(74) *Attorney, Agent, or Firm* — Sughrue Mion, PLLC

(57) ABSTRACT

An air bag comprises inside and outside base fabrics that are stitched to constitute an outer bag that is flat when receiving no gas. The outer bag is formed with a gas inlet opening through which an inflation gas is led into the outer bag to expand the same. The air bag further comprises inside and outside smaller fabrics that are stitched to constitute an inner bag that is installed in the outer bag. Given portions of the inside and outside smaller fabrics are stitched to given portions of the inside and outside base fabrics respectively to form a plurality of narrow auxiliary chambers between the inner bag and the outer bag.

12 Claims, 3 Drawing Sheets

CURTAIN AIR BAG DEVICE AND METHOD OF PRODUCING THE SAME

BACKGROUND OF THE INVENTION

1. Field of the Invention

The present invention relates to air bag devices that protect vehicle passengers from vehicle collisions, and more particularly to curtain air bag devices that protect the passengers from side vehicle collisions and method of producing the same.

2. Description of the Related Art

Hitherto, in the field of wheeled motor vehicles, various curtain air bag devices have been proposed and put into practical use. Usually, the curtain air bag device is mounted on an upper side portion of a passenger room and upon a vehicle collision (viz., side collision), an air bag of the device is rapidly expanded like a curtain in a space between a passenger (viz., a head of the passenger) and a side window thereby to protect him or her from a severe shock of the collision. One of such air bag devices is disclosed in Japanese Laid-open Patent Application (Tokkai) 2007-196856.

For clarifying the present invention, the curtain air bag device of the Laid-open patent application will be briefly discussed in the following.

The curtain air bag device of the application comprises generally an elongate air bag that includes elongate inside and outside base fabrics connected to each other at respective marginal portions to form an elongate bag and an elongate inner fabric structure that is installed in the elongate air bag and includes mutually connected first and second elongate inner fabrics. For setting the inner fabric structure in the air bag, respective front and rear ends of the first and second inner fabrics and upper and lower connecting portions of the first and second inner fabrics are connected to the inside and outside base fabrics of the air bag. With such setting of the inner fabric structure in the air bag, there are formed in the air bag a plurality of expandable chambers that are arranged in three layers. Thus, upon a vehicle collision, protection of a passenger's head is effected by at least two expanded chambers that are overlapped substantially in a direction of the collision, which brings about a satisfaction in safely protecting the passenger.

SUMMARY OF THE INVENTION

In the above-mentioned known curtain air bag device, the connection of the inner fabric structure to the air bag is made by adhesive. Although adhesive is effective for obtaining assured seal at mutually connected portions of two fabrics, usage of such adhesive sometimes fails to provide the mutually connected portions with a satisfied bonding power. Of course, usage of a high power adhesive inevitably induces increase of cost of the air bag device. Furthermore, when the adhesive applied is cured, a flexibility of the mutually connected portions becomes lowered due to hardening of the cured adhesive. In this case, the mutually connected portions and major portions of the fabric material of the air bag show a marked difference in flexibility therebetween. In such case, the mutually connected hardened portions are obliged to suffer a stress concentration when the chambers are applied with a high gas pressure upon a collision. For the reasons as mentioned hereinabove, selection of adhesives practically usable for connection of the inner fabric structure with the air bag is not easy. Furthermore, usage of adhesives for such connection requests the air bag to avoid movement of itself until the adhesive becomes sufficiently cured, which however brings about lowering of labor effectiveness.

It is therefore an object of the present invention to provide a curtain air bag device which is free of the above-mentioned drawbacks.

It is another object of the present invention to provide a method of producing the curtain air bag device which is free of the above-mentioned drawbacks.

In accordance with the present invention, there is provided an air bag device which comprises a gas generator that produces a gas when operated; and an air bag that is expanded when receiving the gas through a gas inlet opening, the air bag being adapted to be mounted on and along a side portion of a passenger room of a motor vehicle when it is flat, wherein the air bag comprises inside and outside base fabrics that are combined to constitute an outer bag that is flat when receiving no gas, the outer bag being formed with the gas inlet opening; and inside and outside smaller fabrics that are combined to constitute an inner bag that is installed in the outer bag keeping a given space therebetween, given portions of the inside and outside smaller fabrics being stitched to given portions of the inside and outside base fabrics respectively to form a plurality of narrow auxiliary chambers between the inner bag 4 and the outer bag.

In accordance with a second aspect of the present invention, there is provided air bag device which comprises a gas generator that produces a gas when operated; and an air bag that is expanded when receiving the gas through a gas inlet opening, the air bag being adapted to be mounted on and along a side portion of a passage room of a motor vehicle when it is flat, wherein the air bag comprises inside and outside base fabrics that are stitched to each other to constitute a rectangular outer bag that is flat in shape when receiving gas, the outer bag being formed with the gas inlet opening; inside and outside smaller fabrics that are stitched to each other to constitute a rectangular inner bag that is installed in the outer bag, given portions of the inside and outside smaller fabrics being stitched to given portions of the inside and outside base fabrics respectively to form a plurality of narrow auxiliary chambers between the inner bag and the outer bag, the inner bag having front and rear open ends exposed to an interior of the outer bag; a first straight gas passage that is defined between an upper ridge of the inner bag and a ceiling part of the outer bag and extends forward from the gas inlet opening; a second straight gas passage that is defined between a lower edge of the inner bag and a bottom part of the outer bag and spaced from the first straight gas passage by the inner bag; and a plurality of openings formed in the inside and outside smaller fabrics of the inner bag.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a curtain air bag device 100 of the present invention will be described in detail with reference to the accompanying drawings.

Figure 1:
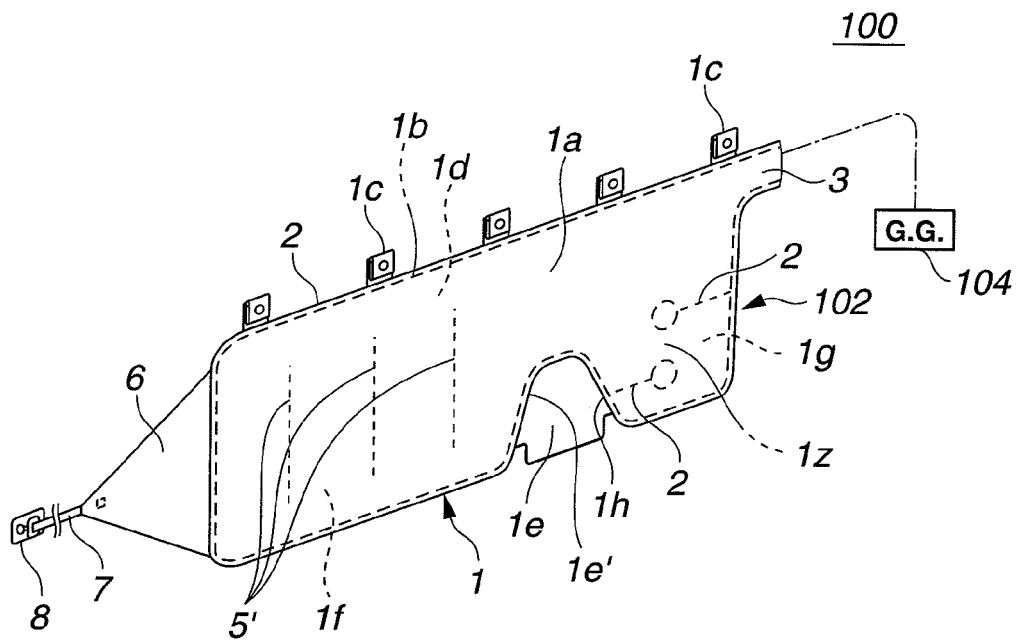
FIG. 1 is a developed view of a curtain air bag device of the present invention.

As will be understood from FIG. 1, the curtain air bag device 100 is constructed to expand rapidly an elongate air bag 102 like a curtain to protect a passenger's head upon a vehicle side collision or the like. Although not shown in the drawings, when not in use, the curtain air bag device 100 is compactly wound up and neatly received in an elongate space that extends along each side edge of a ceiling of a passenger's room.

It is to be noted that the air bag device 100 shown in FIG. 1 is of a type that is mounted on a right upper side of the passenger's room with respect to a travelling direction of an associated motor vehicle.

As is seen from FIG. 1, the elongate air bag 102 comprises elongate inside and outside base fabrics 1a and 1b. As shown, the two base fabrics 1a and 1b are stitched up to each other by a sewing thread 2 along peripheral portions thereof. The inside and outside base fabrics 1a and 1b are each made of a fabric that is woven from 66 Nylon (trade name) of 315 denier and has a mass per unit area of 200 g/m$^2$. Of course, the material of the base fabrics 1a and 1b is not limited to the above-mentioned one.

As is understood from FIG. 1, the elongate air bag 102 is formed at a rear upper part thereof with an inflation gas inlet opening 3. The upper edge of the elongate air bag 102 has a plurality of mounting lugs 1c stitched up thereto. The mounting lugs 1c are fixed to a roof rail (not shown) of the associated motor vehicle.

As is seen from FIG. 1, in an upper part of the interior of the air bag 102, there is formed a straight gas passage 1d that extends from the gas inlet opening 3 to a front upper end of the air bag 102. Thus, upon a vehicle collision (viz., side collision), an inflation gas from the gas inlet opening 3 is rushed into the straight gas passage 1d.

A gas generator (viz., inflator) 104 is installed near the gas inlet opening 3 for producing the inflation gas upon a vehicle collision.

The air bag 102 has at a rear lower part thereof a generally triangular non-expandable fabric portion 1e.

The non-expandable fabric portion 1e is produced by providing only the inside base fabric 1a with a triangular cut 1e' and stitching up a margin area of the cut 1e' together with the outside base fabric 1b. Of course, such non-expandable fabric portion 1e may be produced by providing only the outside base fabric 1b with the cut 1e' and stitching up the margin area of the cut 1e' together with the inside base fabric 1a.

It is to be noted that, due to provision of such non-expandable fabric portion 1e, the interior of the elongate air bag 102 is divided into a larger front expandable chamber 1f and a smaller rear expandable chamber 1g.

Figure 2:
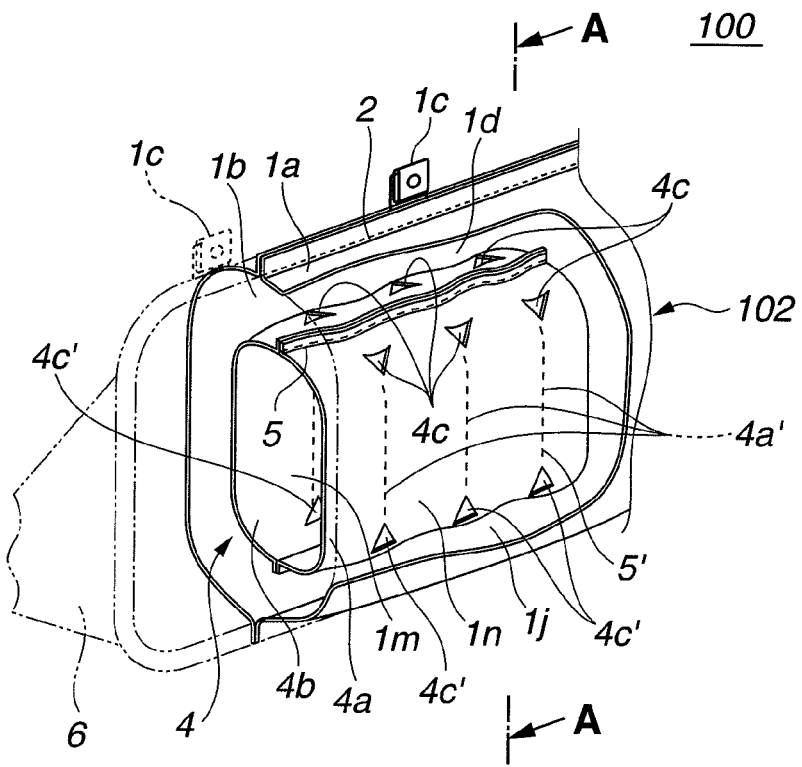
FIG. 2 is a partially cut perspective view of the curtain air bag device of the present invention upon expansion.

As is seen from FIG. 2, within the larger front expandable chamber 1f, there is installed an elongate inner bag 4.

As shown, the elongate inner bag 4 is shaped like a sleeve and has front and rear openings that are respectively exposed to front and rear portions of the larger front expandable chamber 1f.

The elongate inner bag 4 comprises inside and outside smaller fabrics 4a and 4b that are stitched up to each other by a sewing thread 5 along upper and lower mating or overlapped portions. The material of the two smaller fabrics 4a and 4b may be the same as the above-mentioned base fabrics 1a and 1b.

As is seen from FIG. 2, when expanded, the size of the inner bag 4 is sufficiently smaller than that of the larger front expandable chamber 1f.

As is seen from FIG. 2, the inner bag 4 is formed with six upper openings 4c and six lower openings 4c'. More specifically these six openings 4c or 4c' are grouped into two, one extending along one side of the upper or lower mating portions of the inside and outside smaller fabrics 4a and 4b, and the other extending along the other side of the upper or lower mating portions.

As is seen, each opening 4c or 4c' is shaped generally triangular.

Figure 3:
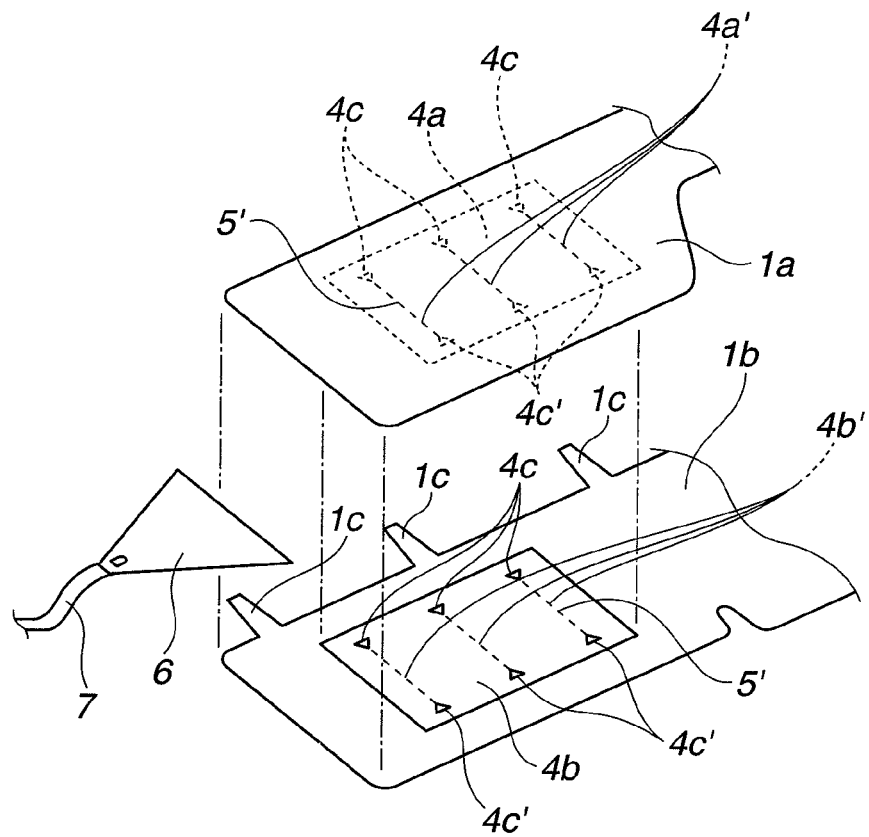
FIG. 3 is a schematic view showing one of steps of producing the curtain air bag device of the present invention.
Figure 5:
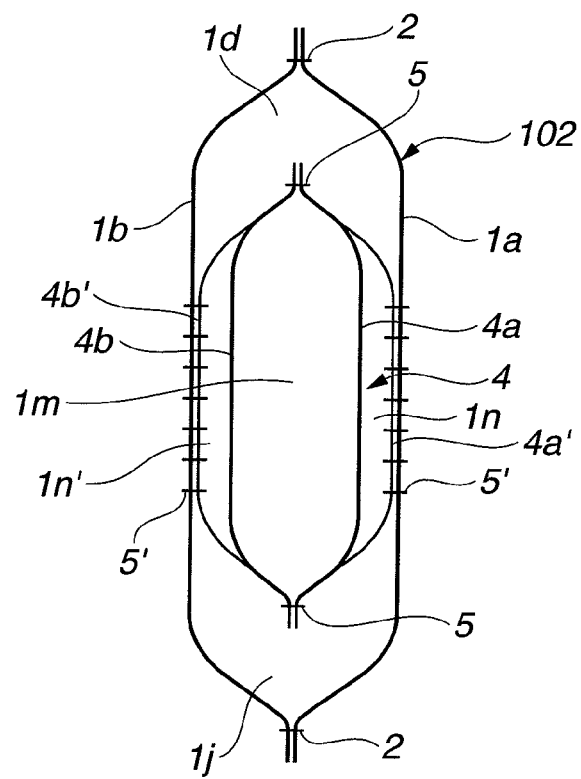
FIG. 5 is a schematically illustrated sectional view taken along the line A-A of FIG. 2.

It is now to be noted that as is seen from FIGS. 2, 3 and 5, vertically extending straight parts 4a' of the inside smaller fabric 4a, each extending between paired upper and lower openings 4c and 4c', are stitched up to the inside base fabric 1a by a sewing thread 5' and like this, vertically extending straight parts 4b' of the outside smaller fabric 4b, each extending between paired upper and lower openings 4c and 4c', are stitched up to the outside base fabric 1b by the sewing thread 5'.

As is seen from FIGS. 2 and 5, the above-mentioned straight gas passage 1d is defined in the air bag 102 between the upper edge of the inner bag 4 and the upper edge of the air bag 102. Furthermore, another straight gas passage 1j is defined in the air bag 102 between the lower edge of the inner bag 4 and the lower edge of the air bag 102, which passage 1j has a substantially same size as the passage 1d, as shown.

As is seen from FIG. 1, to a front end of the air bag 102, there is stitched a base side of a triangular tether cloth 6 by the sewing thread 2. That is, attaching the tether cloth 6 to the air bag 102 is effected simultaneously at the time when the elongate inside and outside base fabrics 1a and 1b are stitched by the sewing thread 2 for forming the air bag 102.

As is clearly shown by FIG. 3, to the apex of the tether cloth 6, there is connected a tether belt 7 that extends forward to a bracket 8 (see FIG. 1) fixed to a front pillar (not shown) of the vehicle body.

As is seen from FIG. 1, the smaller rear expandable chamber 1g is formed with a zigzag passage 1z that is provided by stitching two straight portions of the base fabrics 1a and 1b by the sewing thread 2, as shown. With such zigzag passage 1z, feeding of the inflation gas from the gas inlet opening 3 to both the larger front expandable chamber 1f and smaller rear expandable chamber 1g is suitably balanced. Furthermore, due to provision of the zigzag passage 1z, the smaller rear expandable chamber 1g can take a desired shape when expanded.

In the following, a method of producing the above-mentioned curtain air bag device 100 will be described with reference to the drawings, especially FIGS. 3, 4, 5 and 6.

First, as is seen from FIG. 3, the inside and outside base fabrics 1a and 1b, which are rectangular in shape, are prepared. Although not shown in FIG. 3, the inside base fabric 1a is formed with the above-mentioned triangular cut 1e' (see FIG. 1), and both the inside and outside base fabrics 1a and 1b are respectively formed with ear portions for forming the above-mentioned inflation gas inlet opening 3 (see FIG. 3).

Then, the inside and outside smaller fabrics 4a and 4b are prepared, which are rectangular in shape. Each fabric 4a or 4b is formed with three pairs of openings 4c and 4c', as is seen from FIG. 3.

Then, to given portions of inner surfaces of the base fabrics 1a and 1b, there are respectively put the inside and outside smaller fabrics 4a and 4b precisely. Of course, the given portions are portions that assure an exact positioning of the produced inner bag 4 in the larger front expandable chamber 1f provided in the air bag 102. In this case, it is important to place the inside and outside smaller fabrics 4a and 4b on exact positions of the inside and outside base fabrics 1a and 1b leaving an equal clearance between an upper edge of the base fabric 1a and an upper edge of the smaller fabric 4a, between a lower edge of the base fabric 1a and a lower edge of the smaller fabric 4a, between an upper edge of the base fabric 1b and an upper edge of the smaller fabric 4b, and between a lower edge of the base fabric 1b and a lower edge of the smaller fabric 4b.

Then, as is seen from FIG. 3, each straight part 4a' of the inside smaller fabric 4a that extends between paired openings 4c and 4c' is stitched up to the inside base fabric 1a by the sewing thread 5' and like this, each straight part 4b' of the outside smaller fabric 4b that extends between paired openings 4c and 4c' is stitched up to the outside base fabric 1b by the sewing thread 5'. If desired, the straight parts 4a' and 4b' that are stitched up may be applied with a sealant to completely seal minute openings that are inevitably produced when the stitching work is carried out. Furthermore, if desired, the stitching may be carried out with the aid of adhesive. That is, in this case, an adhesive, such as a sheet of thermosetting material or the like, is intimately put between the smaller fabric 4a or 4b and the base fabric 1a or 1b and then the two fabrics 4a and 1a (or, 4b and 1b) are pressed and heated for bonding the two fabrics, and then stitching is applied to the bonded fabrics 4a and 1a (or, 4b and 1b). With the aid of the adhesive, the stitching is easily and precisely carried out.

Then, the inside and outside base fabrics 1a and 1b are laid to overlap each other having the inside and outside smaller fabrics 4a and 4b put therebetween. Under this condition, the inside and outside base fabrics 1a and 1b should be precisely overlapped.

Figure 4:
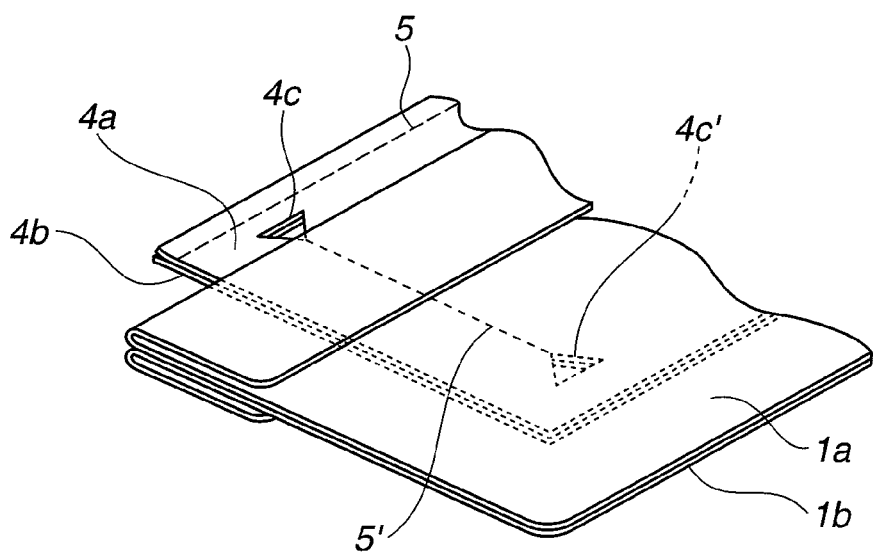
FIG. 4 is an enlarged perspective view of one portion of the curtain air bag device under production process.

Then, as is seen from FIG. 4, upper side portions (as viewed in FIGS. 3 and 4) of the overlapped inside and outside base fabrics 1a and 1b are folded back to expose the overlapped upper side portions of the smaller fabrics 4a and 4b.

Then, the overlapped upper side portions of the smaller fabrics 4a and 4b are stitched up by the sewing thread 5.

Then, like the above steps, lower side portions of the overlapped inside and outside base fabrics 1a and 1b are folded back to expose the overlapped lower side portions of the smaller fabrics 4a and 4b, and then, the overlapped lower side portions of the smaller fabrics 4a and 4b are stitched up by the sewing thread 5.

Then, the folded back upper and lower portions of the overlapped inside and outside base fabrics 1a and 1b are folded back to their original positions.

Then, as will be understood from FIG. 3, the triangular tether cloth 6 with the tether belt 7 fixed thereto is prepared, and a base side of the triangular tether cloth 6 is intimately put between the overlapped front ends of the inside and outside base fabrics 1a and 1b.

Then, the overlapped peripheral portions of the inside and outside base fabrics 1a and 1b except an area where the inflation gas inlet opening 3 (see FIG. 1) is to be formed and the two straight portions of the base fabrics 1a and 1b for the zigzag passage 1z are stitched up by the sewing thread 2. As is seen form FIG. 1, the sewing thread 2 stitches up a periphery of the triangular cut 1e' of the inside base fabric 1a together with the outside base fabric 1b.

With these steps, the air bag 102 shown in FIG. 1 is produced.

The air bag 102 is then folded up to have a narrow shape, and then the gas generator 104 is connected to the gas inlet opening 3. With this, the curtain air bag device 100 is produced.

The curtain air bag device 100 thus produced is installed to one side portion of the passenger room having the narrow-shaped air bag 102 fixed to a roof rail (not shown) through the mounting lugs 1c, and a front end of the tether belt 7 extending from the tether cloth 6 is fixed to a front pillar (not shown) of the vehicle through the bracket 8. Finally, a retractable or breakable decorative cover member (not shown) is disposed on the side portion of the passenger room to conceal the curtain air bag device 100 from the passenger room.

Although not shown in the drawings, a control unit with a collision sensor is connected to the gas generator 104 for operating the same.

When, due to a side collision, turn over or the like, a collision signal is fed to the control unit from the collision sensor, the control unit operates the gas generator 104 to instantly generate a highly pressurized inflation gas.

Upon this, the highly pressurized gas is rushed into the folded up air bag 102 through the gas inlet opening 3. The greater part of gas is led to the larger front expandable chamber 1f through the straight gas passage 1d and the remaining part of the gas is led to the smaller rear expandable chamber 1g through the zigzag passage 1z.

Thus, the larger front and smaller rear expandable chambers 1f and 1g are forced to expand.

In an initial stage of the expansion, the expanding air bag 102 is rushed out into the passenger room by opening or breaking the decorative cover member and rushed into a certain space between a side window of the vehicle and a head of the passenger in the passenger room.

During the rapid expansion of the air bag 102, the inner bag 4 is simultaneously expanded allowing the pressurized gas to flow thereinto through the front and rear larger openings thereof and the plurality of openings 4c and 4c' thereof, as is understood from FIG. 2.

As is understood from FIGS. 2 and 5, due to introduction of the pressurized gas from upper and lower openings, narrow auxiliary chambers 1n or 1n', (a plurality of first narrow auxiliary chambers 1n, and a plurality of second narrow auxiliary chambers 1n'), each being formed between the smaller fabric 4a (or 4b) and the base fabric 1a (or 1b) and defined between adjacent two stitched straight parts 4a', are also expanded.

Accordingly, as is best understood from FIG. 5, due to formation of such narrow auxiliary chambers 1n and 1n', the interior of the larger front expandable chamber 1f is shaped into a so-called three-layer chamber structure that includes a major expandable chamber 1m defined in the inner bag 4, extending continuosly from a front end to a rear end thereof, and the two narrow auxiliary chambers 1n and 1n' provided at both sides of the major expandable chamber 1m. Due to such three-layer chamber structure, the passenger's head is assuredly restrained or protected by the air bag 102 upon a side vehicle collision.

As is described hereinabove, for producing the air bag 102, stitching to the peripheral portions of the overlapped inside and outside base fabrics 1a and 1b is carried out after the separated inside and outside smaller fabrics 4a and 4b are stitched to the inner surfaces of the separated inside and outside base fabrics 1a and 1b respectively. This step is quite effective for precisely and speedily producing the air bag 102.

In the following, modifications of the present invention will be described.

In the above description, the openings 4c and 4c' are described as triangular openings. However, if desired, the openings 4c and 4c' may have other shapes, for example, circular and rectangular shapes.

In the above description, the straight parts 4a' and 4b' of the inside and outside smaller fabrics 4a and 4b are described as vertically extending parts. However, if desired, such parts 4a' and 4b' may extend laterally. Furthermore, in place of using such straight parts 4a' and 4b', the stitching between the inside smaller fabric 4a and the inside base fabric 1a and that between the outside smaller fabric 4b and the outside base fabric 1b may be made by a plurality of mutually spaced spots each being circular in shape.

Furthermore, if desired, the front and rear larger openings of the inner bag 4 (see FIG. 2) may be reduced in size for more finely controlling the flow of pressurized gas into the inner bag 4.

For reducing the size of the front and rear openings of the inner bag 4, the following method is used which will be described with the aid of FIG. 6.

As shown in the drawing (viz., FIG. 6) and will be understood when referring to FIG. 4, first, the upper and lower side portions of the overlapped inside and outside base fabrics 1a and 1b are folded back in opposite direction to expose the overlapped upper and lower side portions of the smaller fabrics 4a and 4b.

Figure 6:
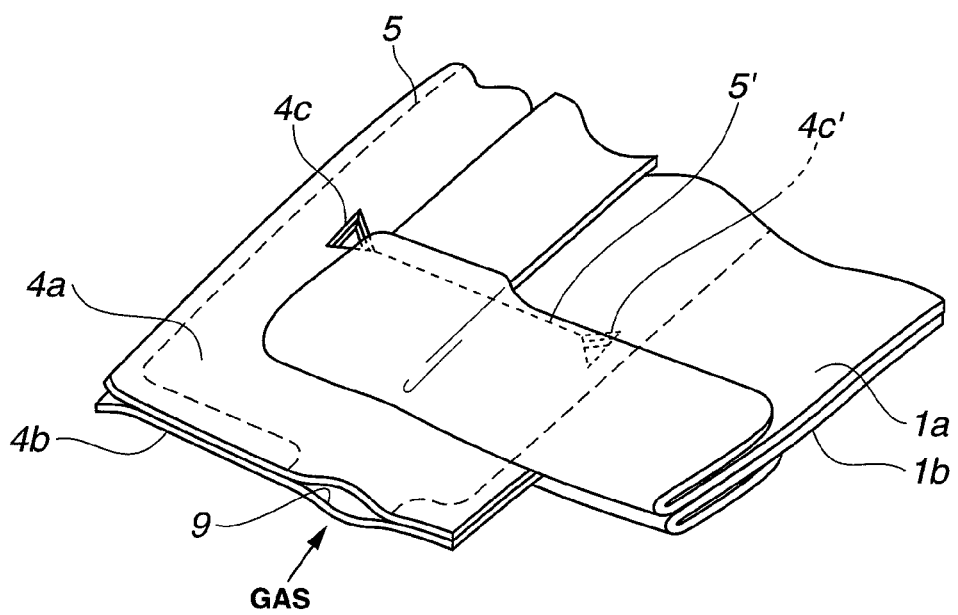
FIG. 6 is a view similar to FIG. 4, but showing an additional step employed for producing a modification of the air bag device of the present invention.

Then, as will be seen from FIG. 6, the left side portion and the right side portion (not shown in the drawing) of the overlapped inside and outside base fabrics 1a and 1b are folded back in opposite directions to expose the overlapped left and right side portions of the smaller fabrics 4a and 4b.

Then, the overlapped upper and lower side portions of the smaller fabrics 4a and 4b and the overlapped left and right side portions of the smaller fabrics 4a and 4b are stitched up by the sewing thread 5 except given portions 9 (only one is shown in FIG. 6) of the left and right side portions of the smaller fabrics 4a and 4b.

Then, the folded back upper, lower, left and right portions of the overlapped inside and outside base fabrics 1a and 1b are folded back to their original positions.

Then, as will be understood from FIG. 3, a base side of the triangular tether cloth 6 is put between the overlapped front ends of the inside and outside base fabrics 1a and 1b.

Then, the overlapped peripheral portions of the inside and outside base fabrics 1a and 1b except the area where the inflation gas inlet opening 3 is to be formed and the two straight portions of the base fabrics 1a and 1b for the zigzag passage 1z are stitched up by the sewing thread 2.

With these steps, an air bag 102 having an inner bag 4 with smaller front and rear openings 9 is produced. That is, the inner bag 4 thus produced has the smaller front and rear openings 9 in addition to the upper and lower openings 4c and 4c', which means a longer time needed for fully expanding the inner bag 4 as compared with the narrow auxiliary chambers 1n and 1n', and thus provides the air bag 102 with a desirable multi-step expanding manner.

In the following, advantages of the present invention will be described.

First, since the mutual connection among the fabrics 1a, 1b, 4a, 4b and 6 is made by the sewing threads 2, 5 and 5' stitched thereto, the fabrics can be connected to one another with a sufficient bonding power unlike the afore-mentioned prior art case in which adhesive is used.

Second, due to the nature of the stitches by the threads 2, 5 and 5', flexibility of the mutually connected portions of the fabrics is assured unlike the afore-mentioned prior art case.

Third, as has be just mentioned hereinabove, due to the three-layer chamber structure, the air bag 102 can assuredly protect or restrain a passenger's head in a vehicle side collision. Furthermore, if the front and rear openings of the inner bag 4 are reduced in size, a desirable multi-step expanding can be carried out by the air bag 102.

Fourth, for producing the air bag 102, stitching to the peripheral portions of the overlapped inside and outside base fabrics 1a and 1b is carried out after the separate inside and outside smaller fabrics 4a and 4b are stitched to the inner surfaces of the inside and outside base fabrics 1a and 1b respectively. This step is quite effective for precisely and speedily producing the air bag 102.

The entire contents of Japanese Patent Application 2008-40383 filed Feb. 21, 2008 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An air bag device comprising:
a gas generator that produces a gas when operated; and
an air bag that is expanded when receiving the gas through a gas inlet opening, the air bag being adapted to be mounted on and along a side portion of a passenger room of a motor vehicle when it is flat,
wherein the air bag comprises:
inside and outside base fabrics that are stitched to constitute an outer bag that is flat when receiving no gas, the outer bag being formed with the gas inlet opening; and
inside and outside smaller fabrics that are stitched together to constitute an inner bag that defines a major expandable chamber, the inner bag being in the outer bag with a given space therebetween,
wherein the inside smaller fabric is stitched to the inside base fabric to form a plurality of first narrow auxiliary chambers defined between the inside smaller fabric and the inside base fabric,
wherein the outside smaller fabric is stitched to the outside base fabric to form a plurality of second narrow auxiliary chambers defined between the outside smaller fabric and the outside base fabric, and
wherein the major expandable chamber defines a space extending from a front end of the inner bag to a rear end of the inner bag and between said plurality of first narrow auxiliary chambers and said plurality of second narrow auxiliary chambers.

2. An air bag device as claimed in claim 1, in which the given portions of the inside and outside smaller fabrics are straight in shape and the given portions of the inside and outside base fabrics are straight in shape.

3. An air bag device as claimed in claim 2, in which the given straight portions of the inside and outside smaller fabrics and the given straight portions of the inside and outside base fabrics extend in a direction generally perpendicular to an axial direction of the inner bag.

4. An air bag device as claimed in claim 3, in which both the outer and inner bags are rectangular in shape when they are flat.

5. An air bag device as claimed in claim 2, in which the length of each of the mutually stitched straight portions is shorter than a vertical length of each of the inside and outside smaller fabrics.

6. An air bag device as claimed in claim 5, in which the inner bag is formed, at portions near opposed ends of the mutually stitched straight portions, with openings that communicate an interior of the inner bag with the given space between the inner and outer bags.

7. An air bag device as claimed in claim 1, in which the gas inlet opening is provided by stitching given portions of the inside and outside base fabrics.

8. An air bag device as claimed in claim 7, in which the outer and inner bags are arranged to form therebetween a first straight gas passage that extends from the gas inlet opening and a second straight gas passage that is spaced from the first straight gas passage by the inner bag.

9. An air bag device as claimed in claim 1, wherein the front and rear ends of the inner bag open into the outer bag.

10. An air bag device as claimed in claim 9, in which the front and rear open ends of the inner bag are reduced in size by stitching given portions of the front and rear ends of the inside and outside smaller fabrics.

11. An air bag device comprising:
a gas generator that produces a gas when operated; and
an air bag that is expanded when receiving the gas through a gas inlet opening, the air bag being adapted to be mounted on and along a side portion of a passage room of a motor vehicle when it is flat,
wherein the air bag comprises:
inside and outside base fabrics that are stitched to each other to constitute a rectangular outer bag that is flat in shape when receiving gas, the outer bag being formed with the gas inlet opening;
inside and outside smaller fabrics that are stitched together to constitute a rectangular inner bag that defines a major expandable chamber, the inner bag being in the outer bag, the inner bag having front and rear open ends exposed to an interior of the outer bag;
wherein the inside smaller fabric is stitched to the inside base fabric to form a plurality of first narrow auxiliary chambers defined between the inside smaller fabric and the inside base fabric,
wherein the outside smaller fabric is stitched to the outside base fabric to form a plurality of second narrow auxiliary chambers defined between the outside smaller fabric and the outside base fabric, and
wherein the major expandable chamber defines a space extending from the front open end to the rear open end of the inner bag and between said plurality of first narrow auxiliary chambers and said plurality of second narrow auxiliary chambers,
a first straight gas passage that is defined between an upper ridge of the inner bag and a ceiling part of the outer bag and extends forward from the gas inlet opening;
a second straight gas passage that is defined between a lower edge of the inner bag and a bottom part of the outer bag and spaced from the first straight gas passage by the inner bag; and
a plurality of openings formed in the inside and outside smaller fabrics of the inner bag.

12. A method of producing an air bag of an air bag device, the air bag device including a gas generator that feeds the air bag with a gas to expand the same when operated, the air bag including inside and outside base fabrics that are combined to constitute an outer bag that is flat in shape when receiving no gas, the outer bag being formed with the gas inlet opening; and inside and outside smaller fabrics that are combined to constitute an inner bag that defines a major expandable chamber extending from a front end of the inner bag to a rear end of the inner bag, the inner bag being in the outer bag with a given space therebetween, given portions of the inside and outside smaller fabrics being stitched to given portions of the inside and outside base fabrics respectively to form a plurality of narrow auxiliary chambers between the inner bag and the outer bag,
the method comprising:
(a) stitching a first base fabric to a first smaller fabric to constitute a first flat unit;
(b) stitching a second base fabric to a second smaller fabric to constitute a second flat unit;
(c) overlapping the first and second flat units having the first and second smaller fabrics put between the first and second base fabrics;
(d) folding overlapped peripheral end portions of the first and second base fabrics back to expose overlapped peripheral end portions of the first and second smaller fabrics;
(e) stitching the overlapped peripheral end portions of the first and second smaller fabrics;
(f) folding the folded back peripheral end portions of the first and second base fabrics back to original flat positions while concealing the stitched overlapped peripheral end portions of the first and second smaller fabrics; and
(g) stitching the overlapped peripheral end portions of the first and second base fabrics thereby to constitute a bag.

* * * * *